(12) United States Patent
Tashiro et al.

(10) Patent No.: US 8,625,232 B2
(45) Date of Patent: Jan. 7, 2014

(54) DISK DRIVE DEVICE ROTATIONALLY DRIVING RECORDING DISK

(75) Inventors: Tomoyuki Tashiro, Amphurmuang (TH); Yoshio Hirata, Shizuoka (JP); Hiroshi Iwai, Shizuoka (JP)

(73) Assignee: Samsung Electro-Mechanics Japan Advanced Technology Co., Ltd., Shizuoka (JP)

( * ) Notice: Subject to any disclaimer, the term of this patent is extended or adjusted under 35 U.S.C. 154(b) by 212 days.

(21) Appl. No.: 12/694,967

(22) Filed: Jan. 27, 2010

(65) Prior Publication Data
US 2010/0238590 A1 Sep. 23, 2010

(30) Foreign Application Priority Data
Mar. 19, 2009 (JP) ................... 2009-068739

(51) Int. Cl.
*G11B 33/14* (2006.01)
(52) U.S. Cl.
USPC ..................... 360/99.17; 360/97.19
(58) Field of Classification Search
USPC ............ 360/97.14–97.19, 97.2, 97.21, 360/99.14–99.19, 99.2, 99.21
See application file for complete search history.

(56) References Cited

U.S. PATENT DOCUMENTS

| | | | | |
|---|---|---|---|---|
| 4,825,316 A | * | 4/1989 | Kishi et al. | 360/99.19 |
| 4,980,786 A | * | 12/1990 | O'Sullivan et al. | 360/99.18 |
| 5,161,770 A | * | 11/1992 | Morehouse et al. | 248/632 |
| 5,214,549 A | * | 5/1993 | Baker et al. | 360/99.19 |
| 5,235,482 A | * | 8/1993 | Schmitz | 360/99.22 |
| 5,396,388 A | * | 3/1995 | Brown | 360/265 |
| 5,414,574 A | * | 5/1995 | Boutaghou et al. | 360/99.17 |
| 5,426,562 A | * | 6/1995 | Morehouse et al. | 361/679.34 |
| 5,446,609 A | * | 8/1995 | Thanos et al. | 360/99.18 |
| 5,510,954 A | * | 4/1996 | Wyler | 361/679.54 |
| 5,546,250 A | * | 8/1996 | Diel | 360/99.16 |
| 5,625,515 A | * | 4/1997 | Brown | 360/265 |
| 5,666,239 A | * | 9/1997 | Pottebaum | 360/99.23 |
| 5,703,734 A | * | 12/1997 | Berberich et al. | 360/99.18 |
| 5,757,580 A | * | 5/1998 | Andress et al. | 360/99.19 |
| 5,770,133 A | * | 6/1998 | Boutaghou | 264/135 |
| 5,898,537 A | * | 4/1999 | Oizumi et al. | 360/99.18 |
| 6,002,546 A | * | 12/1999 | Yagi et al. | 360/99.19 |
| 6,023,392 A | * | 2/2000 | Kim | 360/99.18 |
| 6,034,841 A | * | 3/2000 | Albrecht et al. | 360/99.17 |
| 6,055,140 A | * | 4/2000 | Marchon | 360/135 |
| 6,172,842 B1 | * | 1/2001 | Satoh et al. | 360/99.19 |
| 6,424,488 B1 | * | 7/2002 | Misso et al. | 360/98.08 |
| 6,426,847 B1 | * | 7/2002 | Dague et al. | 360/99.16 |
| 6,469,864 B2 | * | 10/2002 | Kamezawa et al. | 360/97.21 |
| 6,496,326 B1 | * | 12/2002 | Boutaghou | 360/99.17 |
| 6,619,667 B2 | * | 9/2003 | Kawaguchi et al. | 277/628 |
| 6,721,128 B1 | * | 4/2004 | Koizumi et al. | 360/99.21 |
| 6,764,734 B2 | * | 7/2004 | Vierk et al. | 428/847.1 |

(Continued)

FOREIGN PATENT DOCUMENTS

JP 11-120533 4/1999

*Primary Examiner* — Brian Miller
(74) *Attorney, Agent, or Firm* — Blank Rome LLP

(57) ABSTRACT

A disk drive device is provided with a base, a hub on which a recording disk is to be mounted, a bearing unit arranged on the base and configured to rotatably support the hub, and a spindle drive unit configured to rotatably drive the hub. A circumferential ring wall portion is arranged on the outer circumference of the base and formed of a plastic.

11 Claims, 7 Drawing Sheets

(56) References Cited

U.S. PATENT DOCUMENTS

| | | | | |
|---|---|---|---|---|
| 6,844,636 | B2* | 1/2005 | Lieu et al. | 310/43 |
| 6,894,867 | B2* | 5/2005 | Hong et al. | 360/97.15 |
| 6,911,166 | B2* | 6/2005 | Neal | 264/40.5 |
| 6,922,308 | B1* | 7/2005 | Butler | 360/99.18 |
| 6,941,640 | B2* | 9/2005 | Neal et al. | 29/603.03 |
| 6,965,487 | B2* | 11/2005 | Hanada et al. | 360/69 |
| 7,027,259 | B2* | 4/2006 | Myokan et al. | 360/97.14 |
| 7,190,548 | B2* | 3/2007 | Neal et al. | 360/99.15 |
| 7,215,506 | B2* | 5/2007 | Albrecht et al. | 360/99.15 |
| 7,307,811 | B2* | 12/2007 | Xu et al. | 360/97.17 |
| 7,319,571 | B2* | 1/2008 | Xu et al. | 360/99.15 |
| 7,330,334 | B2* | 2/2008 | Shimizu et al. | 360/97.14 |
| 7,359,144 | B2* | 4/2008 | Xu et al. | 360/99.21 |
| 7,417,823 | B2* | 8/2008 | Lim et al. | 360/97.19 |
| 7,450,339 | B2* | 11/2008 | Hirano et al. | 360/97.19 |
| 7,453,667 | B2* | 11/2008 | Cho et al. | 360/97.19 |
| 7,483,237 | B2* | 1/2009 | Hong et al. | 360/99.15 |
| 7,616,401 | B2* | 11/2009 | Xu et al. | 360/99.16 |
| 7,652,845 | B2* | 1/2010 | Xu et al. | 360/97.12 |
| 8,009,384 | B1* | 8/2011 | Little | 360/97.14 |
| 2001/0045782 | A1* | 11/2001 | Lieu et al. | 310/67 R |
| 2002/0015263 | A1* | 2/2002 | Ooi et al. | 360/264.9 |
| 2002/0075590 | A1* | 6/2002 | Garikipati et al. | 360/97.02 |
| 2003/0071382 | A1* | 4/2003 | Neal | 264/40.5 |
| 2003/0081347 | A1* | 5/2003 | Neal et al. | 360/97.01 |
| 2003/0218827 | A1* | 11/2003 | Teo et al. | 360/97.01 |
| 2004/0233573 | A1* | 11/2004 | Kuwajima et al. | 360/97.01 |
| 2006/0274493 | A1* | 12/2006 | Richardson et al. | 361/683 |
| 2007/0079499 | A1* | 4/2007 | Neal et al. | 29/603.03 |
| 2009/0067085 | A1* | 3/2009 | Gross et al. | 360/97.02 |

* cited by examiner

DISK DRIVE DEVICE ROTATIONALLY DRIVING RECORDING DISK

CROSS-REFERENCE TO RELATED APPLICATION

This application claims priority from Japanese Application No. 2009-068739, filed Mar. 19, 2009.

BACKGROUND OF THE INVENTION

1. Field of the Invention

The present invention relates to a disk drive device that drives a recording disk.

2. Description of the Related Art

Recently, disk drive devices such as HDDs (Hard Disk Drives) are required to be further small in size. With such background, in a disk drive device that record data, for example, magnetically, data are recorded/reproduced with a magnetic head flying above a recording disk such that a slight gap between both is maintained while the recording disk is being rotated at a high speed. In order to miniaturize such a disk drive device, there is a demand that data are recorded/reproduced with the gap between the magnetic head and the recording disk being extremely narrow, for example, less than or equal to 10 nm.

In order to miniaturize disk drive devices, a magnetoresistive effect element (hereinafter, referred to as an "MR element") is used for the magnetic head. Due to the use of the MR element in such a narrow gap, there is a fear that a thermal asperity failure (hereinafter, referred to as "TA failure") or a head crash failure may occur in the magnetic head. Specifically, the TA failure means that: minor foreign substances on the surface of the recording disk are in contact with the MR element while the magnetic head is flying to trace the recording tracks, and therefore heat is momentarily caused in the MR element due to kinetic energy of the foreign substances; and the resistance value of the MR element momentarily varies with the MR element being momentary heated followed by being cooled, resulting in superimposition of the varied resistance value on a reproduced signal as a noise such that correct reading of the reproduced signal is interfered.

For example, Japanese Patent Application Publication No. Hei 11-120533 discloses a disk drive device in which a groove is provided near the record/reproduction element of the magnetic head in order to collect minor dust or foreign substances in the groove.

As a result of an investigation by the present inventor, the flowing knowledge has been acquired that the TA failure is caused with foreign substances (hereinafter, referred to as "particles") that adhere to a disk drive device, having a size of 0.1 μm to approximately several μm, adhering to the surface of a recording disk due to a vibration or a flow of air.

The disk drive device is provided with a member that forms a closed clean air space filled with clean air, and further provided with a recording disk and a hub that drives the recording disk mounted thereon in the clean air space, a bearing unit that rotatably supports the hub, a spindle drive unit that rotatably drives the hub, and a drive unit that drives the magnetic head in a fluctuating manner.

Particles sometimes occur from the member that forms the clean air space. The particles enter the clean air space and adhere to the recording disk. As more particles adhere to the recording disk, the probability of an occurrence of TA failure is increased. In addition, if more particles exist in the clean air space when the gap between the magnetic head and the recording disk is narrower, the probability of an occurrence of TA failure is increased. Thereby, correct reading of a reproduced signal may be interfered.

SUMMARY OF THE INVENTION

The present invention has been made in view of these situations, and a purpose of the invention is to provide a technique in which occurrence of particles from a member that forms a clean air space in a disk drive device is reduced.

In order to solve the aforementioned problem, a disk drive device according to an embodiment of the present invention comprises: a base, a hub on which a recording disk is to be mounted, a bearing unit arranged on the base and configured to rotatably support the hub, and a spindle drive unit configured to rotatably drive the hub. The disk drive device has a circumferential ring wall portion, formed of a plastic, on the outer circumference of the base.

According to the embodiment, particles due to rust do not occur from the circumferential ring wall portion.

Another embodiment of the present invention also relates to a disk drive device. The device comprises: a base, a hub on which a recording disk is to be mounted, a bearing unit arranged on the base and configured to rotatably support the hub, a spindle drive unit configured to rotatably drive the hub, and a dust collecting filter provided on the outer circumference of the base. The base comprises a guide groove on the surface thereof, facing the mounted recording disk, so that air flows into a suction port for the dust collecting filter when the recording disk is rotated.

According to the embodiment, particles are guided to the dust collecting filter by the guide groove to which the particles have been brought by the flow of air generated with the rotation of the recording disk, thereby allowing the particles to be collected by the dust collecting filter.

BRIEF DESCRIPTION OF THE DRAWINGS

Embodiments will now be described, by way of example only, with reference to the accompanying drawings, which are meant to be exemplary, not limiting, and wherein like elements are numbered alike in several figures, in which.

DETAILED DESCRIPTION OF THE INVENTION

Figure 1A:
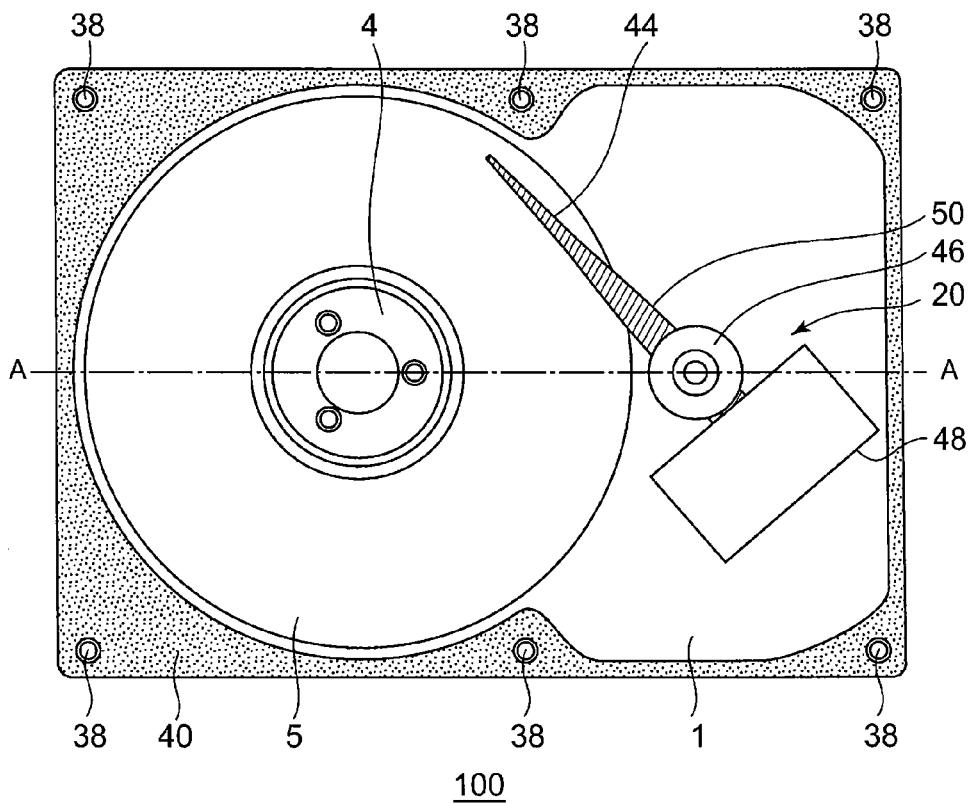
FIG. 1A is a top view of a disk drive device according to an embodiment.

The invention will now be described by reference to the preferred embodiments. This does not intend to limit the scope of the present invention, but to exemplify the invention.

The present invention will now be described with reference to the accompanying drawings based on the preferred embodiments and a comparative technique. The same or equivalent constituting elements and members illustrated in each drawing shall be denoted by the same reference numerals, and duplicative explanations will be omitted appropriately. Dimensions of members illustrated in each drawing are appropriately enlarged or reduced for ease of understanding. Part of the members not important for describing the embodiments and the comparative technique are omitted from each drawing.

Figure 1B:
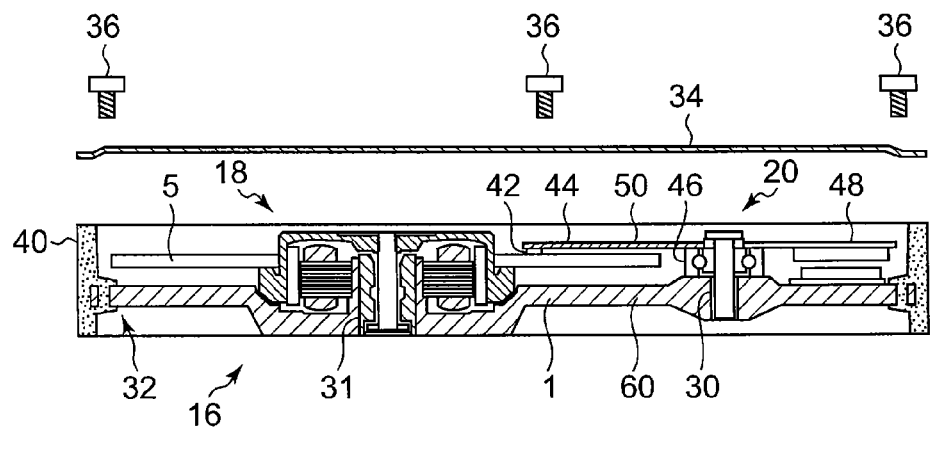
FIG. 1B is a cross-sectional view of the disk drive device according to the embodiment.
Figure 2:
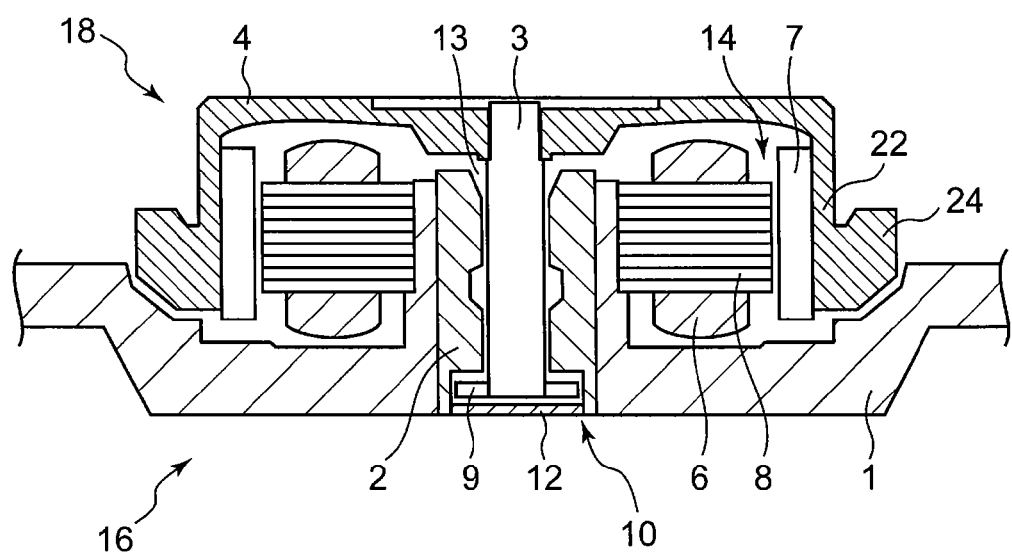
FIG. 2 is a cross-sectional view of part of the disk drive device according to the embodiment.

FIG. 1A is a top view of a disk drive device 100 according to an embodiment, and FIG. 1B is a cross-sectional view of the disk drive device 100 according to the embodiment. FIG. 2 is a cross-sectional view of part of the disk drive device 100 according to the embodiment. FIGS. 1B and 2 are cross-sectional views taken along line A-A of FIG. 1A. The disk drive device 100 comprises a fixed body portion 16, a rotating body portion 18, a head drive unit 20, a top cover 34, and a screw 36. The fixed body portion 16 and the rotating body portion 18 include a bearing unit 10 configured to support, in a relatively rotatable manner, a hub 4 in the rotating body portion 18, and a spindle drive unit 14 configured to rotatably drive the hub 4.

The fixed body portion 16 has a chassis 32 whose cross-section is approximately concave-shaped, a stator core 8 fixed to a base 1 of the chassis 32, a three-phase coil 6 wound around a salient pole of the stator core 8, and a sleeve 2. The chassis 32 is provided with the base 1, a flat area of the concaved portion, and a circumferential ring wall portion 40 formed on the outer circumference of the base 1. The base 1 has a bearing hole 31 through which the sleeve 2 and the shaft 3 are inserted, and a pivot hole 30 through which a pivot assembly 46 is inserted. The outer circumferential surface of the circumferential ring wall portion 40 is formed into a rectangle. The inner circumferential surface of the circumferential ring wall portion 40 is formed with an annular portion surrounding the recording disk 5 and a rectangular portion surrounding the area where the head drive unit 20 is mounted, being connected together. The circumferential ring wall portion 40 serves as a supporting member for supporting the disk drive device 100 in the rotational axis direction of the shaft 3 (hereinafter, this direction is referred to as the "vertical direction"). On the other hand, the base 1 serves as a supporting member for supporting the disk drive device 100 in the direction perpendicular to the rotational axis direction of the shaft 3 (hereinafter, this direction is referred to as the "horizontal direction"). The base 1 and the circumferential ring wall portion 40 according to the embodiment are formed of different members, respectively. The top cover 34 is arranged at the upper end of the circumferential ring wall portion 40 and is fixed by screwing the screw 36 into a screw hole 38 provided on the upper end surface side of the circumferential ring wall portion 40.

The approximately cylindrical-shaped sleeve 2 is fixed to the bearing hole 31 in the approximately center portion of the base 1. One end of the sleeve 2 is fixed to a disk-shaped plate 12. That is, the lower end of the sleeve 2 is fixed to the plate 12 so as to be sealed by the plate 12, so that a lubricant does not leak out.

The stator core 8 has a circular portion and twelve salient poles extending therefrom in the radial direction. The stator core 8 is formed by laminating a plurality of magnetic plates such as ferrosilicon plates and then by performing insulation coating made by electro-deposition coating and powder coating, etc., on the surface of the laminated magnetic plates. The magnet 7 is formed of a rare earth material, for example, an Nd—Fe—B (Neodymium-Ferrum-Boron) material, and on the surface thereof an anti-corrosion treatment is performed by electro-deposition coating or spray coating, etc. The magnet 7 has, for example, eight driving magnet poles along the circumferential direction of the inner circumferential portion of the magnet 7.

The rotating body portion 18 has the approximately cup-shaped hub 4 on which the recording disk 5 is to be mounted, the shaft 3 whose one end is fixed to the hub 4, a flange 9 fixed to the other end of the shaft 3, and the approximately cylindrical-shaped magnet 7 fixed to the inner cylindrical portion 22 of the hub 4.

The upper end of the shaft 3 is fixed to the center hole of the hub 4 and the lower end thereof is fixed to the disk-shaped flange 9.

The hub 4 is formed by machining, such as pressing and cutting, a steel plate having soft magnetism into a predetermined shape of an approximately cup-like shape. The doughnut-shaped recording disk 5 is mounted on an outward extension portion 24 of the hub 4, the outward extension portion being flange-shaped.

The bearing unit 10 has a radial dynamic pressure groove and a thrust dynamic pressure groove. The bearing unit 10 may be configured to include the shaft 3 and the sleeve 2, and is arranged on the base 1. The radial dynamic pressure groove and the thrust dynamic pressure groove serve as a bearing that rotatably supports the hub 4. Two herringbone-shaped radial dynamic pressure grooves are formed on the inner circumferential surface of the sleeve 2 so as to be vertically spaced apart from each other. The herringbone-shaped or spiral-shaped thrust dynamic pressure grooves are formed on the surface of the flange 9, facing the lower surface of the sleeve 2, and on the surface of the flange 9, facing the plate 12.

A capillary seal portion 13 is provided on the upper open end side of the sleeve 2 and is formed such that the space between the inner circumferential surface of the sleeve 2 and the outer circumferential surface of the shaft 3 gradually extends toward the upper open end. A lubricant, such as oil, is injected into the space formed by the aforementioned radial dynamic pressure groove and the surface facing the groove, the thrust dynamic pressure groove and facing the groove, and the capillary seal portion 13. The boundary surface (liquid level) of the lubricant where the lubricant is in contact with ambient air is set to a position in the middle of the capillary seal portion 13. The capillary seal portion 13 prevents a leak of the lubricant by capillarity.

With the rotation of the shaft 3, the radial dynamic pressure groove generates a radial dynamic pressure in the lubricant such that the rotating body portion 18 is supported in the radial direction. With the rotation of the flange 9, the thrust dynamic pressure groove generates a thrust dynamic pressure in the lubricant such that the rotating body portion 18 is supported in the thrust direction. The radial dynamic pressure groove and the capillary seal portion 13 may be formed in the shaft 3 such that the inner circumferential surface of the sleeve 2 is linearly formed.

The spindle drive unit 14 has the stator core 8, the coil 6, and the magnet 7. The coil 6 is formed by winding a predetermined wire around the salient pole of the stator core 8, starting from the lower side of the salient pole, until a predetermined number of wirings are performed; and thereafter by winding the predetermined wire around the successively adjacent salient pole of the stator core 8, starting from the upper side of the salient pole. As stated above, after a predetermined number of wirings have been performed around the salient poles of the stator core 8 in succession, the end of the wire where the winding has ended is pulled out toward the lower side of the salient pole of the stator core 8. The end of the wire is further pulled out toward the opposite side of the base 1 thorough the hole provided in the base 1 so as to be electrically connected to a wiring member wired on the lower surface of the opposite side of the base 1. The end of the wire thus pulled out is fixed with an adhesive so as not to unlay. Such fixation of the wire is performed such that disconnection of the wire, due to a vibration of a large amplitude created by a resonance of the wire during an ultrasonic wave cleaning, is prevented. When a three-phase current having an approximate sine wave shape is applied to the coil 6 through the wiring member by a predetermined drive circuit, the coil 6 generates a rotating magnetic field. A rotating drive force is generated by the interaction of the driving magnetic poles of the magnet 7 with the rotating magnetic field generated by the coil 6, which rotates the rotating body portion 18. That is, the spindle drive unit 14 rotationally drives the rotating body portion 18.

The head drive unit 20 comprises a magnetic head 42, a head suspension 44, a swing arm 50, a pivot assembly 46, and a voice coil motor 48. The magnetic head 42 is fixed to the tip of the head suspension 44. The head suspension 44 is fixed to one end of the swing arm 50. The rotational axis of the swing arm 50 is fixed to the base 1 via the pivot assembly 46. That is, the pivot assembly 46 is inserted through the pivot hole 30 to be supported by the base 1. The voice coil motor 48 makes the swing arm 50 fluctuate around the rotational axis of the pivot assembly 46 such that the magnetic head 42 is transported to a desired position in the recording disk 5.

A clean air space 52 is formed by being sealed with the chassis 32 and the top cover 34 that covers the space of the concaved portion of the chassis 32. The clean air space 52 is filled with clean air from which particles are removed. The recording disk 5, which is a magnetic recording medium, the rotating body portion 18, and the head drive unit 20 are arranged in the clean air space 52.

Figure 8A:
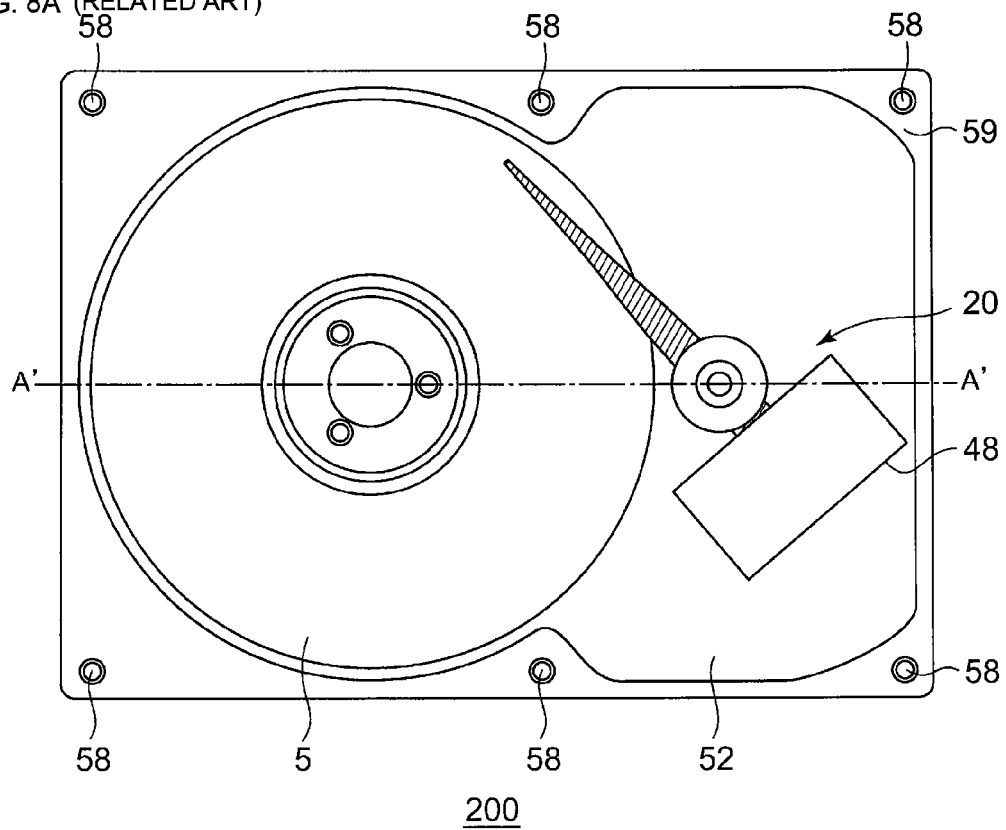
FIG. 8A is a top view of a disk drive device according to a comparative technique.
Figure 8B:
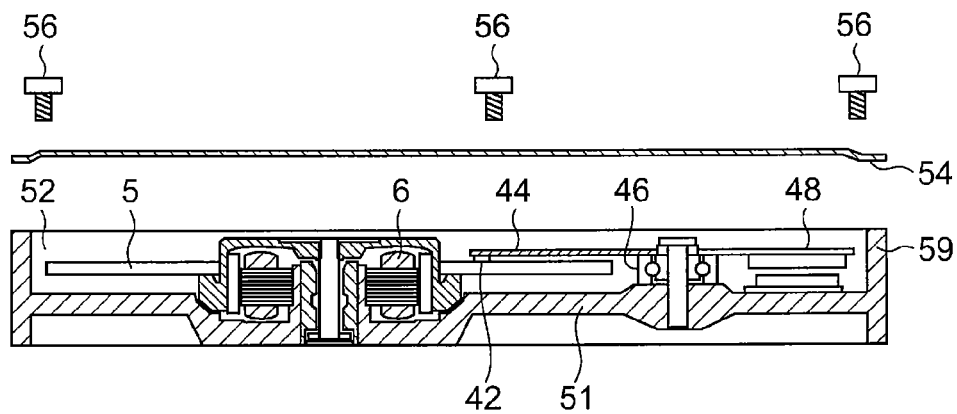
FIG. 8B is a cross-sectional view of the disk drive device according to the comparative technique.

Herein, the problem recognized by the present inventor will be described based on the structure according to the comparative technique. FIG. 8A is a top view of a disk drive device 200 according to the comparative technique, and FIG. 8B is a cross-sectional view of the disk drive device 200 according to the comparative technique. FIG. 8B is a cross-sectional view taken along line A'-A' of FIG. 8A.

A base 51 and a circumferential ring wall portion 59 on the outer circumference of the base 51, in the disk drive device 200 according to the comparative technique, are formed by cutting a base material integrally molded by the aluminum die-casting. The circumferential ring wall portion 59 is provided with a plurality of screw holes 58 for fixing a top cover 54 with a screw 56. The screw holes 58 are formed by drilling the base material formed by the aluminum die-casting and thereafter by tapping. Subsequently, the base 51 and the circumferential ring wall portion 59 are cleaned with water to remove foreign substances such as particles on the surfaces of both. However, a slight amount of the cleaning water remains in the screw holes 58 after the cleaning. The remaining cleaning water reacts with the aluminum material, which causes rust. There has been a problem that the rust becomes particles and enter the clean air space 52 then adhere to the recording disk, which increases the probability of an occurrence of TA failure.

Referring back to FIG. 1, the circumferential ring wall portion 40 according to the embodiment is formed by the plastic molding in order to deal with this problem.

As a result, no particles from the rust caused in the circumferential ring wall portion 40 are located and hence less particles adhere to the recording disk 5, accordingly allowing the occurrences of TA failure to be reduced. As a plastic for molding the circumferential ring wall portion 40, various materials such as a thermosetting plastic and a thermoplastic, can be used. For example, SUMIKA SUPER® LCP (Liquid Crystal Polymer) made by Sumitomo Chemical Co., Ltd.® that is an LCP, C-600 SG made by Idemitsu Kosan Co., Ltd.® that is a PPS (Polyphenylene Sulfide), or ULTEM made by Nippon Polypenco Ltd.® that is a PEI (Polyetherimide), are preferable in terms of easily ensuring the accuracy. When conductivity is needed in order to deal with static electricity, carbon fibers may be added in the plastic for molding the circumferential ring wall portion 40. In addition, glass fibers may be added in the plastic for molding the circumferential ring wall portion 40 in order to enhance its mechanical strength.

Further, the circumferential ring wall portion 40 according to the embodiment is formed by filling a mold with a plastic in a state where the base 1 is placed in the mold. Thereby, there is no space in the boundary portion between the base 1 and the circumferential ring wall portion 40, allowing the airtightness of the clean air space 52 to be enhanced. As a method of filling a mold with a plastic, various methods can be adopted. For example, the injection molding or the compression molding is preferable in terms of easily ensuring the accuracy. In addition, the base 1 may be formed in advance by the following-described method.

The circumferential ring wall portion 40 according to the embodiment may be formed by filling a mold with a plastic material with the use of a side gate method, a pin gate method, or a film gate method. Thereby, a desired shape of the circumferential ring wall portion 40 can be formed stably and accurately, and hence the space in the boundary portion between the circumferential ring wall portion 40 and the top cover 34 is nearly zero even when the top cover 34 is fixed to the circumferential ring wall portion 40, allowing the airtightness of the clean air space 52 to be enhanced. In the side gate method, the plastic material is injected into the wall portion on the outer circumference side of the circumferential ring wall portion 40. As a result, partial unevenness of its density in the circumferential ring wall portion 40 is eliminated, allowing the desired shape of the circumferential ring wall portion 40 to be obtained stably. In the pin gate method, the plastic material is injected into the upper end surface of the circumferential ring wall portion 40, which is in contact with the top cover 34. As a result, unevenness of its density in the circumferential ring wall portion 40 is eliminated, allowing the desired shape of the circumferential ring wall portion 40 to be obtained stably. In the film gate method, the plastic material is injected into the wall portion on the outer circumference side of the circumferential ring wall portion 40. As a result, the density of the plastic material is further evened out, allowing the desired shape of the circumferential ring wall portion 40 to be obtained stably. In addition, the surface of the circumferential ring wall portion 40 becomes flatter in the use temperature range, thereby the space in the boundary portion between the circumferential ring wall portion 40 and the top cover 34 is nearly zero even when the top cover 34 is fixed to the circumferential ring wall portion 40, allowing the airtightness of the clean air space 52 to be enhanced.

A holes-including area 60 of the base 1 may be formed integrally. Specifically, the holes-including area, having the pivot hole 30 through which the rotational axis of the head drive unit 20 for driving the magnetic head 42 is inserted and the bearing hole 31 through which the bearing unit 10 is inserted, may be integrated when the pivot hole 30 and the bearing hole 31 are formed. The holes-including area 60 includes the area where the pivot hole 30 and the bearing hole 31 are formed and the area where the pivot hole 30 and the bearing hole 31 are connected together. Alternatively, the holes-including area 60 may be the entire base 1. The integral formation of the holes-including area 60 means that the holes-including area 60 is composed of one member. Accordingly, the integral formation of the holes-including area 60 does not include the case where, for example, the area of the base 1 where the pivot hole 30 and the bearing hole 31 are connected together is in advance separate from the base 1, and the base 1 is formed by fixing respective members, respectively necessary for the pivot hole 30 and the bearing hole 31, to both holes and subsequently by connecting the separate area to the base 1. For example, the pivot hole 30 and the bearing hole 31, included in the holes-including area 60, are simultaneously formed in the same process. For example, in the disk drive device 100, the positional relationship between the rotational center of the head drive unit 20 and that of the recording disk 5 sometimes varies over time due to the error in joining both or temperature. If such positional relationship varies, the magnetic head 42 cannot trace a desired recording track, causing an error rate in reading/writing data to be increased. By integrally forming the holes-including area 60, the variation in the positional relationship can be smaller, allowing the error rate in reading/writing data to be reduced.

The holes-including area 60 of the base 1 may be formed of an aluminum alloy and integrally formed by the die-casting (hereinafter, referred to as the "aluminum die-casting"). For example, the pivot hole 30 and the bearing hole 31 are integrally formed in the holes-including area 60 of the base 1 by the same machining process after a cation electrodeposition coating (hereinafter, referred to as an "ED coat") is performed on the base material formed by the aluminum die-casting molding. Thereby, a variation in the positional relationship on the base 1 between the rotational center of the head drive unit 20 and that of the recording disk 5 is smaller, allowing the error rate in reading/writing data to be further reduced.

Alternatively, the holes-including area 60 may be integrally formed by pressing a metal plate material. Thereby, efforts in processing the holes-including area 60 of the base 1 is reduced, allowing the productivity of the disk drive device 100 to be improved. As a metal plate material, the following materials may be used. For example, the metal plate whose major element is aluminum is preferable in terms of being lightweight and rust-resistant. The metal plate obtained by the press-molding of a cold rolled plate and then by performing an electroless nickel plating has strong magnetism, and therefore preferable in terms of stabilizing the rotational accuracy of the rotating body portion 18 by drawing the magnet 7 even if a vibration moment is applied to the disk drive device 100 and in terms of having a high strength. A stainless metal plate is preferable in terms of having a high strength and being rust-resistant. In particular, a stainless steel having strong magnetism, such as a ferritic stainless steel (SUS430), is preferable in terms of stabilizing the rotational accuracy of the rotating body portion 18 by drawing the magnet 7 even if a vibration moment is applied to the disk drive device 100 and in terms of having a high strength and being rust-resistant. As a process of the metal plate, the following process may be used. For example, the metal plate is formed by pressing with the use of a progressive mold or a transfer mold. In the process, the pivot hole 30 and the bearing hole 31 may be formed in the same process.

Figure 3:
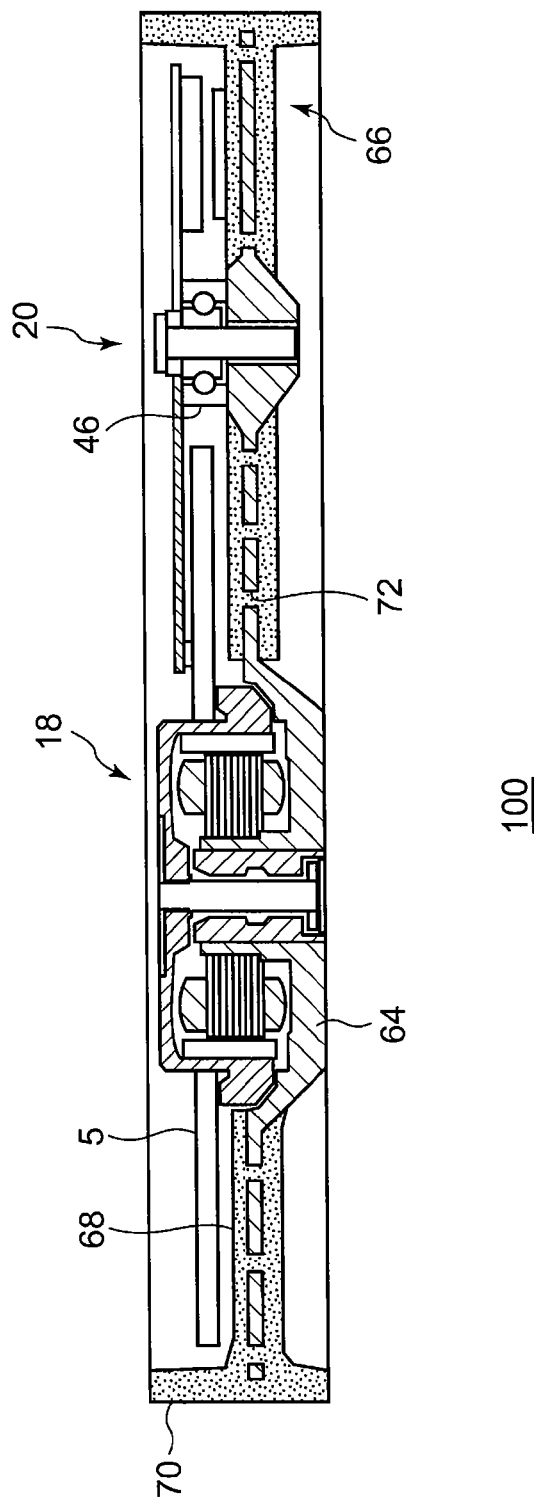
FIG. 3 is a cross-sectional view of a variation of the disk drive device according to the embodiment.

FIG. 3 is a cross-sectional view of a variation of the disk drive device 100 according to the embodiment. In the drawing, the area of a base 64, facing the mounted recording disk 5, is covered with a cover portion 68 formed of a plastic. That is, a chassis 66 further comprises the cover portion 68 in addition to the base 64 and a circumferential ring wall portion 70 of the outer frame of the chassis 66. As illustrated in the drawing, the cover portion 68 covers the pedestal area of the base 64, facing the rotating body portion 18, and the upper surface and the lower surface of the base 64 excluding the pedestal area thereof.

A plurality of joint holes 72 are formed in the area of the base 64, covered with the cover portion 68. The cover portion 68 on the upper side of the base 64 and that on the lower side of the base 64 are joined together via the joint holes 72. Thereby, the degree of adhesion between the base 64 and the cover portion 68 is enhanced, allowing for the horizontal rigidity of the chassis 66 to be enhanced.

The thickness of the base 64 covered with the cover portion 68 is thinner than that of the base 1 illustrated in FIG. 1B. The manufacturing cost of the disk drive device 100 can be suppressed and the disk drive device 100 can be lightweight, by increasing the ratio of the plastic contained in the chassis 66. Machining of portions having a complicated shape can be reduced by replacing part of the surface of the base 64 with a plastic, the molding of which is easily performed, allowing the productivity of the disk drive device 100 to be improved. The cover portion 68 and the circumferential ring wall portion 70 may be formed by filling a mold with a plastic in a state where the base 64 is placed in the mold. Thereby, the productivity can be expected to be more improved. In the pin gate method, a plastic material may be injected into the circumferential ring wall portion 70 of the base 64 and into the upper surface of the cover portion 68. The material of the cover portion 68 may be the same as that of the circumferential ring wall portion 40.

Figure 4:
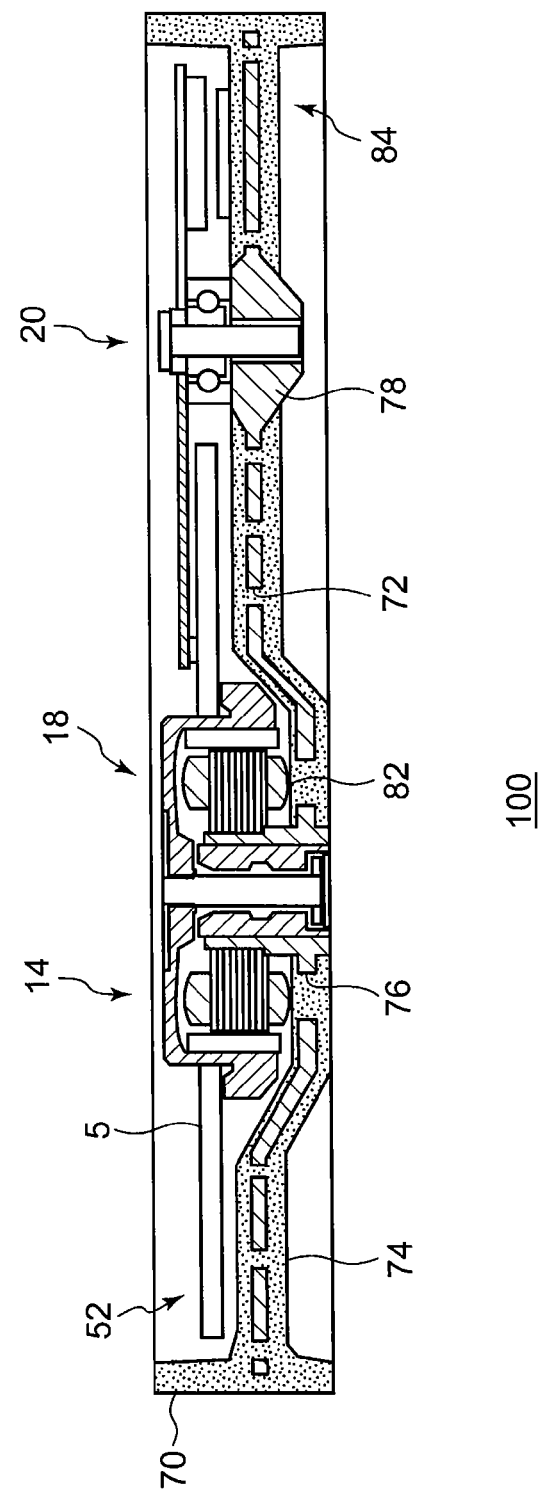
FIG. 4 is a cross-sectional view of a variation of the disk drive device according to the embodiment.

FIG. 4 is a cross-sectional view of a variation of the disk drive device 100 according to the embodiment. In the drawing, a cover portion 74 formed of a plastic covers the area of the base, facing the spindle drive unit 14. That is, the area of a base 78, covered with the cover portion 74, is more increased by the pedestal area of the base 78, facing the rotating body portion 18, than the area covered by the cover portion 68 illustrated in FIG. 3. A chassis 84 further comprises the cover portion 74 in addition to the base 78 and the circumferential ring wall portion 70 of the outer frame of the chassis 84.

The base 78 may have a hole 76 around the bearing hole 31 through which the bearing unit 10 is inserted. That is, the base 78 has the hole 76 in the pedestal area facing the rotating body portion 18. The hole 76 may include the joint hole 72. The hole 76 is sealed by the cover portion 74 such that the air-tightness of the clean air space 52 is maintained, preventing particles from entering the clean air space 52. The disk drive device 100 can be lightweight by providing the hole 76 in the metal base 78. The circumferential ring wall portion 70 and the cover portion 74 may be formed by filling a mold with a plastic in a state where the base 78 is placed in the mold. Thereby, the productivity can be expected to be more improved. As a method of forming the hole 76, the following process may be used. For example, the metal plate is formed by pressing with the use of a progressive mold or a transfer mold. In this process, the pivot hole 30, the bearing hole 31, and the hole 76 may be formed in the same process.

When the base 51 and the coil 6 according to the comparative technique in FIG. 8 are located closely, there is a fear that the coil 6 and the metal base 51 facing the coil 6 may be in contact with each other, resulting in a short circuit of the coil 6. To deal with this problem, the hole 76 of the base 78 is provided at a position facing the coil of the spindle drive unit 14, as illustrated in FIG. 4. The area 82 of the chassis 84, facing the coil 6, is formed of the plastic of the cover portion 74. Thereby, a short circuit of the coil 6 can be prevented. The material of the cover portion 74 may be the same as that of the circumferential ring wall portion 40.

Figure 5:
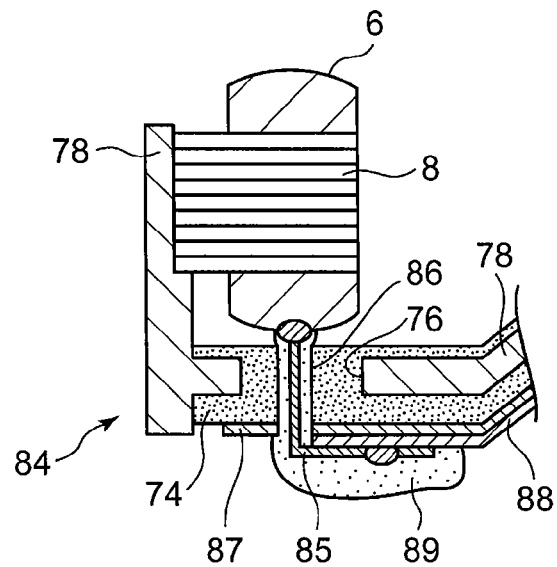
FIG. 5 is a cross-sectional view of a variation of the disk drive device according to the embodiment.

FIG. 5 is a cross-sectional view of a variation of the disk drive device 100 according to the embodiment. In this drawing, wiring of a wire 85 of the coil 6, wound around the stator core 8, will be described. The wire 85 of the coil 6 is pulled out toward the lower surface side of the chassis 84 through a drawing hole 86 of the cover portion 74, the drawing hole 86 being formed of a plastic. Thereby, the drawing hole 86 is formed of the plastic, and hence a short circuit of the coil 6 can be prevented even if the wire 83 is in contact with the inner circumferential surface of the drawing hole 86. The portion of the wire 85, which is not wound around the stator core 8, is referred to as the "drawing portion of the wire 85".

The drawing hole 86 may be formed in the cover portion 74 in which the hole 76 provided in the base 78 is buried. That is, the cover portion 74 forms the drawing hole 86 whose diameter is smaller than that of the hole 76 while covering the hole 76. The wire 85 is pulled out through the drawing hole 86 formed of a plastic so as to be electrically connected to a wiring member 88. That is, the wire 85 is wired through the drawing hole 86. An insulating member 87 is fixed, with, for example, a double-faced tape, etc., to the lower surface on the non-clean air space side of the chassis 84. The wiring member 88 to which the wire 85 is connected is adhered on the insulating member 87. A protective member 89 is formed by applying a liquid resin to the drawing hole 86 and the drawing portion of the wire 85 in order to protect the drawing portion of the wire 85. The protective member 89 is formed by radiating ultraviolet rays immediately after the application of the liquid resin to the drawing potion of the wire 85 in order to cure the surface of the protective member 89, and then by placing the protective member 89 into a heating furnace in order to cure the inside of the protective member 89. As a liquid resin for the protective member 89, a resin whose major component is an epoxy acrylic hybrid resin is preferable. The material of the insulating member 87 may be polyimide.

Figure 6:
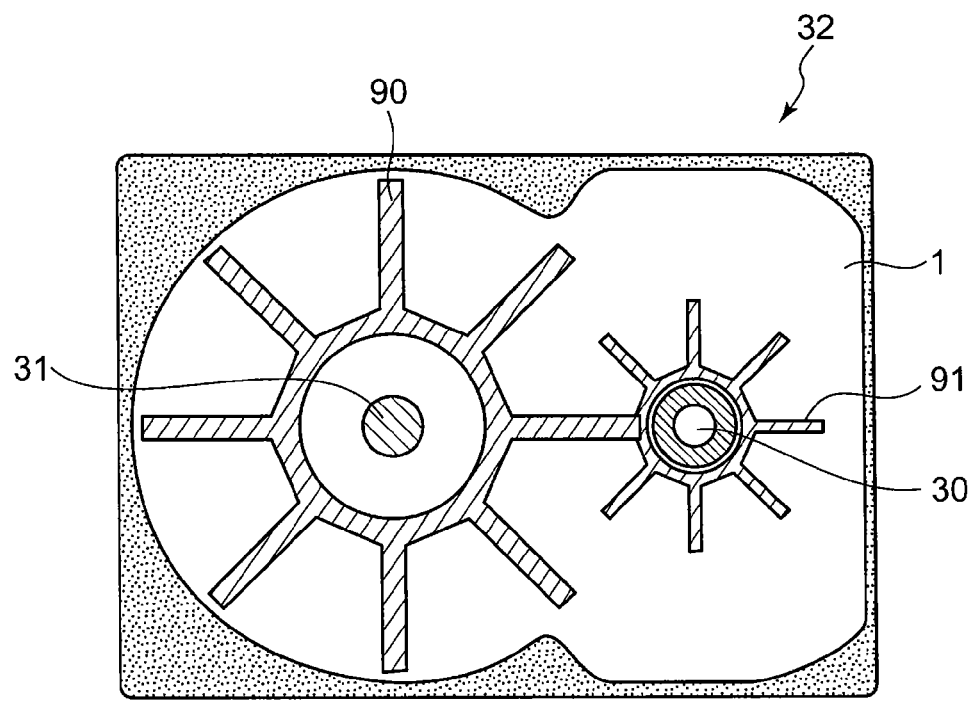
FIG. 6 is a bottom view of the disk drive device according to the embodiment.

FIG. 6 is a bottom view of the disk drive device 100 according to the embodiment. The chassis 32 may have a first rib 90 around the bearing hole 31 through which the bearing unit 10 is inserted, on the lower surface of the chassis 32. The chassis 32 may also have a second rib 91 around the pivot hole 30 on the lower surface of the chassis 32. The first rib 90 and the second rib 91 may be formed on the base. The first rib 90 has a first ring surrounding the bearing hole 31 and a first extension portion radially extending from the first ring. The second rib 91 has a second ring surrounding the pivot hole 30 and a second extension portion radially extending from the second ring. With the first rib 90 and the second rib 91, the entire rigidity of the chassis 32 can be enhanced, allowing for a variation in the positional relationship between the rotational center of the head drive unit 20 and the rotational center of the rotating body portion 18 to be suppressed. The base on which the ribs are formed may be covered with the aforementioned cover portion. Thereby, the rigidity of the chassis formed of a material having an increased ratio of a plastic can be complemented. The first rib 90 and the second rib 91 may be formed by using the following process. For example, the metal plate is formed by pressing with the use of a progressive mold or a transfer mold. In the process, the pivot hole 30, the bearing hole 31, and the hole 76 may be formed in the same process.

Figures 7A, 7B:
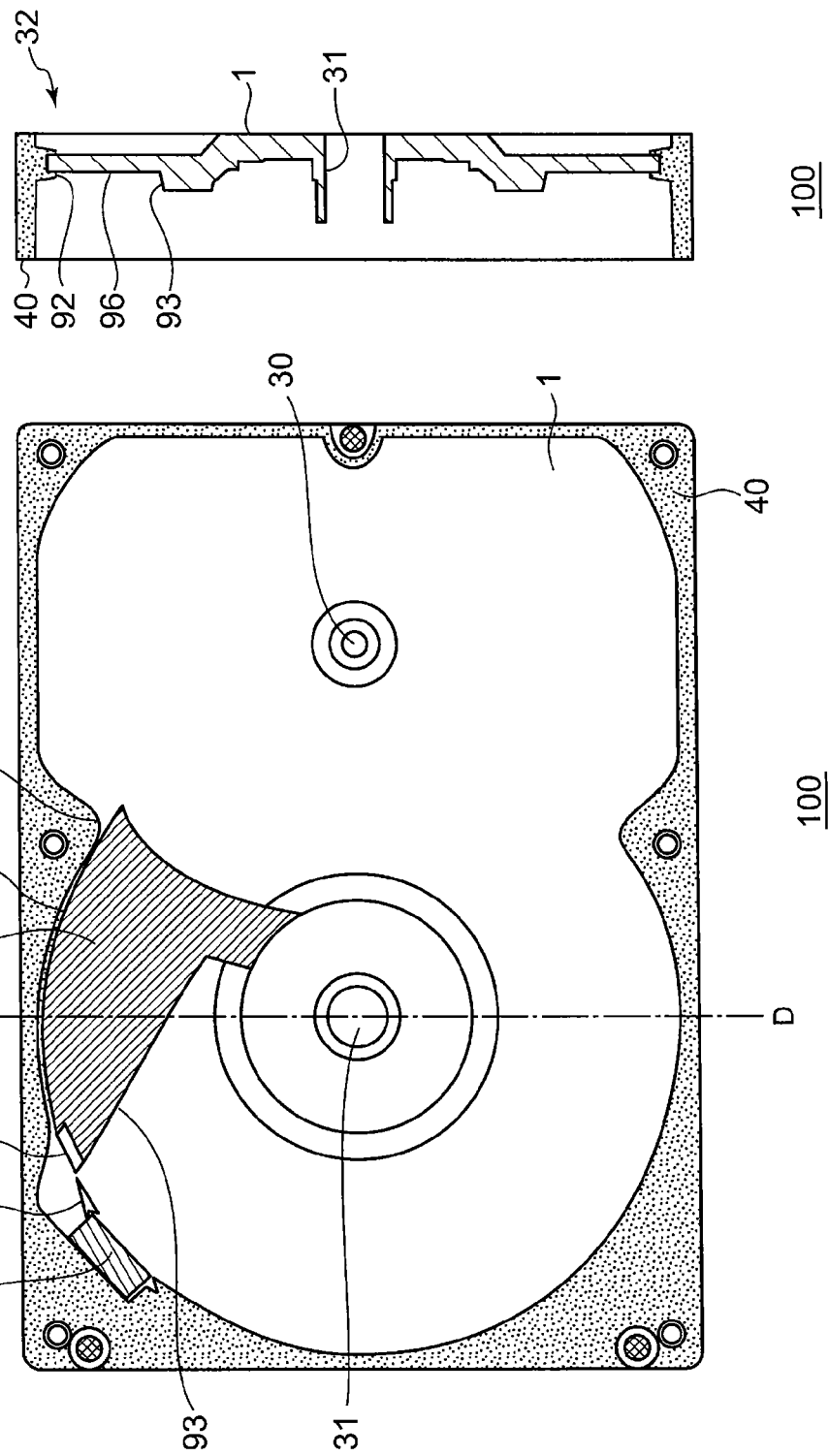
FIG. 7A is a top view of a variation of the disk drive device according to the embodiment.
FIG. 7B is a cross-sectional view of the variation of the disk drive device according to the embodiment.

FIG. 7A is a top view of a variation of the disk drive device 100 according to the embodiment, and FIG. 7B is a cross-sectional view of the variation of the disk drive device 100 according to the embodiment. In FIGS. 7A and 7B, the recording disk 5 and the head drive unit 20, etc., are omitted. FIG. 7B is a cross-sectional view taken along line C-D of FIG. 7A.

The disk drive device 100 comprises the dust collecting filter 94 configured to collect particles in the clean air space 52, a suction port 95 leading to the dust collecting filter 94, and the guide groove 96 leading to the suction port 95. In this drawing, the rotating direction of the recording disk 5 is counterclockwise.

The dust collecting filter 94 is provided in the chassis 32 and is arranged on the outer circumference than the recording disk 5 to be mounted. The guide groove 96 is formed on the surface of the base 1, facing the mounted recording disk 5, so that air flows into the suction port 95 for the dust collecting filter 94 when the recording disk 5 is rotated. The guide groove 96 has a first guide surface 92 and a second guide surface 93, which form the inner wall of the guide groove 96.

The first guide surface 92 is provided in the area between the place 98 where the rectangular portion and the annular portion of the inner circumference of the circumferential ring wall portion 40 are connected together, and the suction port 95, along the annular portion of the inner circumference of the circumferential ring wall portion 40. The second guide surface 93 is lineally provided in the place between the vicinity of the outer circumference of the hub 4 and the suction port 95. The suction port 95 is connectively arranged at the end of the guide groove 96, where the width between the first guide surface 92 and the second guide surface 93 is narrowed. The suction port 95 is located at the vicinity of the outer circumference of the recording disk 5. A flow of air, generated by the rotation of the recording disk 5, is controlled by the first guide surface 92 and the second guide surface 93 such that the controlled air is guided to the dust collecting filter 94.

Herein, when the recording disk 5 is rotated, air flows toward the rotating direction of the recording disk 5 in an annular space in the clean air space 52. When the clean air space 52 in the concaved portion of the chassis 32 is divided into two (up and down) by the straight line connecting the pivot hole 30 and the bearing hole 31, as illustrated in this drawing, air flows from a rectangular space into the annular space on the upper side due to the rotation of the recording disk 5, whereas air flows out from the annular space on the lower side into the rectangular space. Therefore, the suction port 95 and the guide groove 96 are arranged on the side where air flows from the rectangular space into the annular space in the clean air space 52 at the time of the rotation of the recording disk 5, when the chassis 32 is divided into two on the basis of the line connecting the bearing hole 31 and the pivot hole 30. Thereby, particles can be collected efficiently. When the rotating direction of the recording disk 5 is clockwise, the dust collecting filter 94, the suction port 95, and the guide groove 96 are to be provided at the symmetric positions with respect to the line connecting the bearing hole 31 and the pivot hole 30.

A guide portion 97 is provided between the suction port 95 and the dust collecting filter 94 in order to prevent particles from leaking into the annular space in the clean air space 52. The particles, detached by the rotation of the rotating body portion 18 and the recording disk 5, are guided to the dust collecting filter 94 by the guide groove 96 to which the particles are brought by the flow of air generated with the rotation of the recording disk 5, eventually being collected by the dust collecting filter 94. Thereby, the attachment of the particles to the recording disk 5 can be suppressed, allowing an occurrence of TA failure to be suppressed. The embodiment in which the dust collecting filter 94 and the guide groove 96 are provided may be combined with the aforementioned embodiment in which part of the chassis is formed of a plastic, thereby TA failure can be expected to be more improved.

The present invention should not be limited to the aforementioned each embodiment, and various modifications, such as design modifications, can be made with respect to the above embodiments based on the knowledge of those skilled in the art. The structure illustrated in each drawing is intended to exemplify an example, and the structure can be appropriately modified to a structure having a similar function, which can provide similar effects.

What is claimed is:

1. A disk drive device comprising:
   a base;
   a hub on which a recording disk is to be mounted;
   a bearing unit arranged on the base and configured to rotatably support the hub; and
   a drive unit configured to rotatably drive the hub, wherein the disk drive device has a circumferential ring wall portion, formed of a plastic, on the outer circumference of the base, and
   wherein a cover portion covers an entire upper surface and an entire lower surface of the base excluding a pedestal area of the base provided with a pivot assembly and a pedestal area of the base facing the hub, the cover portion comprising a first cover portion on the upper surface of the base and a second cover portion on the lower surface of the base, and the first cover portion and the second cover portion being joined together.

2. The disk drive device according to claim 1, wherein a holes-including area of the base, having a pivot hole through which the rotational axis of a head drive unit for driving a magnetic head is inserted and a bearing hole through which the bearing unit is inserted, is integrated when the pivot hole and the bearing hole are formed.

3. The disk drive device according to claim 2, wherein the holes-including area of the base is formed of an aluminum alloy and integrally formed by a die-casting.

4. The disk drive device according to claim 2, wherein the holes-including area of the base is integrally formed by pressing a metal plate.

5. The disk drive device according to claim 1, wherein the cover portion covers an area of the base, facing the drive unit.

6. The disk drive device according to claim 1, wherein the cover portion and the circumferential ring wall portion are formed integrally.

7. The disk drive device according to claim 1, wherein the material forming the cover portion is the same as that of the circumferential ring wall portion.

8. The disk drive device according to claim 1, wherein an area of the base facing the recording disk is provided with a joint hole extending between the upper and lower surfaces of the base, said cover portion including a connecting portion extending through said joint hole such that the first cover portion and the second cover portion are joined together via the connecting portion.

9. A disk drive device comprising:
   a base having upper and lower surfaces;
   a hub on which a recording disk is to be mounted;
   a bearing unit arranged on the base and configured to rotatably support the hub;
   a drive unit configured to rotatably drive the hub; and
   a cover portion formed of a plastic and configured to cover the base,
   wherein an area of the base facing the recording disk is provided with a joint hole extending between the upper and lower surfaces of the base at a location radially outward of the hub, and
   wherein the cover portion comprises a first cover portion covering the upper surface of the base and a second cover portion covering the lower surface of the base, said cover portion extending through said joint hole such that the first and second cover portions are joined together via the joint hole.

10. The disk drive device according to claim 9, wherein the disk drive device has a circumferential ring wall portion, formed of a plastic, on the outer circumference of the base.

11. The disk drive device according to claim 10, wherein the cover portion and the circumferential ring wall portion are formed integrally.

* * * * *